United States Patent Office 3,827,961
Patented Aug. 6, 1974

3,827,961
METHOD FOR PURIFYING IONICALLY
CONDUCTING SOLUTIONS
Denis Doniat, Moillesulaz, Augusto Porta, Troinex, Geneva, and Jacques Mosetti, Grand-Lancy, Geneva, Switzerland, assignors to Battelle Memorial Institute, Carouge, Geneva, Switzerland
Filed Aug. 31, 1971, Ser. No. 176,572
Claims priority, application Switzerland, Sept. 15, 1970, 13,661/70
Int. Cl. B01k 5/00
U.S. Cl. 204—180 R          4 Claims

ABSTRACT OF THE DISCLOSURE

For purifying ionically conducting solutions by electroadsorption, two collector electrodes separated by a porous partition are used to produce an electrical field in the solution to be purified. At least on one side of the partition, the solution is brought into contact with particles of an adsorbent, electrically conducting material for adsorbing at least one constituent of the solution. Relative movement of the solution with respect to the corresponding electrode provides simultaneous electrical contact between the electrode, the solution and the particles. The electrode is at a given potential with respect to the solution and brings the adsorbent particles to the same potential so as to provide electroadsorption of the constituent.

---

The invention relates to the purification of solutions and in particular to a method and apparatus for purifying ionically conducting solutions, by adsorbing at least one constituent present in dissolved or suspended form in the solution to be purified.

Generally speaking, the seperation of the constituents of ionically conducting solutions or suspensions is an operation which is complicated as well as time-consuming and costly. In particularly, the difficulties of all types are well known, which are met in the operation of installations for the demineralization of water and particularly for the desalination of sea-water. It is likewise known that the treatment of waste waters generally constitutes an imporant problem and particularly in the case of waters containing relatively high concentrations of substances which are particularly noxious to humans as well as animals, such as cyanided substances, among others. It is moreover known that the installations designed hitherto for purifying the blood of a patient with affected kidneys, are highly complex and that it is at present practically impossible to rapidly purify the blood of a person having absorbed a massive dose of barbiturates or of any other poison assimilated by the blood.

When a suitable solid adsorbent material comes into contact with a solution, a potential equilibrium of this material exists, at which adsorption of a substance contained in the solution may occur. This equilibrium potential is nevertheless often insufficient for obtaining an appreciable adsorption effect. As a matter of fact, for each constitent to be adsorbed from a given solution, an optimum adsorption potential exists, at which the selectivity and the amount of a given substance adsorbed by an adsorbent material are highest.

When an adsorbent material forms an electrode and when adsorption is carried out under the action of a potential applied to this electrode with respect to the solution, electroadsorption occurs. An appropriate choice of this potential thus allows selective adsorption of a given substance to be promoted and this constitutes an important advantage of electroadsorption for the purification of ionically conducting solutions. For this purpose, electrodes are generally used between which a slight potential difference is maintained, at least one of the electrodes being formed of a porous body including an adsorbent material which is electrically conducting. The electrical field produced in the liquid by the potential difference applied between the electrodes, permits the migration of ions to the electrode surface at which the adsorption process proper occurs. In the case of neutral constituents of the solution, the displacement occurs through diffusion.

In various applications which may be contemplated for purifying solutions by adsorption, it is however generally required to separate relatively large amounts of impurity. In such cases it becomes essential to use an adsorbent material having a very large surface and to ensure optimum use of this surface. These conditions are, however, difficult to fulfill in a truly satisfactory manner.

A main object of the present invention is to permit truly effective purification of ionically conducting solutions and particularly in the above-mentioned fields, by fully exploiting the advantages of electroadsorption, while at the same time obviating the various above-mentioned drawbacks.

With this object in view, the present invention comprises a method of purifying ionically conducting solutions, by adsorbing at least one constituent present in dissolved or suspended form in the solution to be purified. This method comprises the steps: of producing an electrical field in said solution, by means of two collector electrodes separated from one another by a porous partition; of bringing said solution into contact at least on one side of said partition, with particles of an adsorbent, electrically conducting material capable of adsorbing said constituent, said partition being impermeable to these particles and permeable at least to the ions of the solution and to the constituent to be adsorbed; and of producing a relative movement of the solution in contact with the adsorbing particles with respect to the electrode which is situated on the same side of the partition and is brought to a given potential with respect to the solution, so as to ensure, through said movement, a simultaneous electrical contact between said electrode, said solution and said particles, so as to bring each particle of adsorbent material to said potential and thereby to permit selective adsorption of said constituent on said particles, under the action of said potential.

The present invention further relates to a device for purifying ionically conducting solutions, by adsorbing at least one constituent present in dissolved or suspended form in the solution to be purified, said device comprising: a chamber adapted to receive said solution, divided into two compartments by a porous partition which is permeable to the ions of the said solution; a collector electrode arranged in each of said compartments, said electrodes being adapted to be connected to a direct current source so as to produce an electrical field in said solution, across said partition, and so as to bring at least one of said electrodes to a given potential with respect to the solution; a charge of particles of an adsorbent, electrically conducting material capable of adsorbing at least one constituent of said solution, arranged at least in the compartment comprising said one collector electrode so as to permit electrical contact of the particles with the said electrode; and means for circulating the solution, adapted to produce in each compartment containing the said particles of adsorbent material, a relative movement of the solution to be purified with respect to the corresponding collector electrode, the whole arrangement being such as to provide repeated, simultaneous electrical contact between said solution, each particle of adsorbent material and the said collector electrode.

Thanks to the present invention, it thus becomes possible to ensure selective and optimum electroadsorption of various substances contained in solution or in suspension in a solution to be purified. Through such use of the adsorbent material in the form of particles, it becomes possible not only to substantially increase the adsorbent surface, but also to utilize the very large available surface in an optimum manner. As a matter of fact, the relative movement of the solution during contact thereof with the particles, with respect to a collector electrode which is brought to a given potention, allows the whole solution to be successively brought into intimate contact with the surface of all the particles of adsorbent material, while bringing said particles to the same potential as the collector electrode. Moreover, an appropriate choice of said potential depending on the solution to be purified and on the constituent to be separated therefrom, allows the available surface of each particle to be utilized in a most efficient manner and allows selective optimum electroadsorption to be achieved.

The porous partition provided for in the present invention serves essentially to form, between the collector electrodes a barrier within which is permeable to the ions of said solution and prevents passage of the particles of adsorbent material from one electrode to the other. This allows ionic migration across said partition, while each of said adsorbent particles comes into contact with only one collector electrode maintained at a suitable potential for effecting the desired electroadsorption and is prevented by said partition from also reaching the other collector electrode where the reverse process could occur, whereby the desired electroadsorption effect would be annulled.

This porous partition may thus be formed of any suitable material which is permeable to the ions of the solution and impermeable to the adsorbent particles which are used and said material must obviously be substantially inert with respect to the solution to be purified. This partition may thus be made of an electronically non-conducting material, such as a microporous plastics material (e.g. PVC, Nylon, etc.) or else of an electroncially conducting material, such as an inert metal. In the latter case, the partition must obviously be so arranged as to prevent a short-circuit from occurring between the collector electrodes.

The choice of the size of the particles is not in itself critical for obtaining the desired electroadsorption effect. Thus the adsorbent material may be used in the form of a powder or in granular form and the size of the particles may be chosen from a very wide range which may extend between $5\mu$ and 1 mm., for example. The use of relatively small particles obviously provides the advantage of giving the adsorbent material a large specific surface per unit volume and moreover facilitates suspension and circulation of said particles. It is however preferable for the size of the particles to be quite uniform and anyhow sufficiently large with respect to the pores of the porous partition, so as to prevent clogging up said partition by the particles, which would hinder migration of the ions through said partition and would thus affect the electroadsorption unfavourably.

The nature and state of the adsorbent material must obviously be such as to provide an extremely large adsorbing surface and to allow adsorption of a substantial amount of the substances to be separated from the solution to be purified. On the other hand, said adsorbent material must be an electronic conductor so that the particles thereof may be brought to the potential which is necessary for ensuring the desired electroadsorption during their contact with either one or the other of the said collector electrodes. Moreover, said asdorbent material should preferably be substantially inert with respect to the solution to be purified, with a view to ensuring satisfactory utilization of said material and possibly its regeneration to permit renewed use thereof.

Active carbon is a well known adsorbent material which is particularly well suited for effecting electroadsorption according to the present invention. However, depending on the nature of the solution to be purified and of the substance to be separated therefrom, one may contemplate the use of other adsorbent materials which are electrically conducting.

The drawing illustrates several embodiments of a device for carrying out the present invention.

Figure 1:
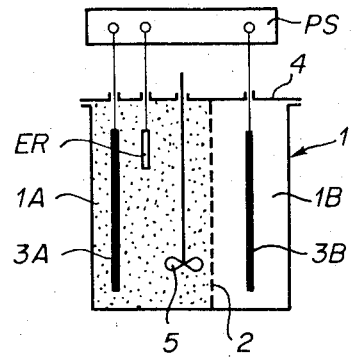
FIG. 1 is a schematic vertical cross-section of a first embodiment.

The device shown in FIG. 1 comprises a container 1 filled with the solution to be purified and divided by a porous partition 2 into two compartments 1A and 1B. A collector electrode 3A, associated with a reference electrode ER and a collector counter-electrode 3B are mounted in the solution to be purified, in the compartments 1A and 1B respectively. These three electrodes 3A, ER and 3B are connected to a potentiostat PS having three terminals. The latter serves to maintain the collector electrode 3A at a given potential of constant value $V_A$ with respect to the reference electrode ER and hence with respect to the solution surrounding this electrode 3A.

The compartment 1A contains particles of adsorbent material, namely active carbon in the present case. A stirrer 5 mounted in said compartment serves on one hand to maintain these particles in suspension in the solution to be purified and, on the other hand, to bring them into repeated contact with the collector electrode 3A. These particles may be formed of any commercially available active carbon such as, for example, that known under the trade name NORIT BRX having a particle size of about 6 to $15\mu$.

The porous partition 2 serves to maintain the particles of adsorbent material in the compartment 1A, whereby to prevent their contact with the counter-electrode 3B. It must thus be impermeable to these particles, while allowing passage of the ions of the solution. The porous partition 2 may thus be formed of a microporous membrane of plastics material, in the present case of PVC (Polyvinyl chloride) having pores with a diameter of 2 to $3\mu$ and a porosity of 80%.

The electrodes 3A and 3B, as well as ER, are electrochemically inert with respect to the constituent of the solution to be purified. Thus, in the present case, the electrode 3A may consist of platinized titanium and the electrode 3B of graphite. The reference electrode ER is in the present case a standard saturated calomel electrode (SCE).

The described device operates as follows:

since the solution to be purified is an ionic conductor, the potentiostat PS establishes an electrical field in this solution, between the electrides 3A and 3B, electrode 3A being brought to a given potential ($V_A$) with respect to the solution which surrounds it.

Thanks to the stirrer 5, the carbon particle comes successively into contact with the collector electrode 3A and are thus brought to the same potential ($V_A$) as this electrode. This potential $V_A$ is determined according to the purification which is contemplated, so as to allow selective electroadsorption, on the particles, of a large amount of at least one given constituent of the solution to be purified.

As is known, adsorption further depends on temperature. Thus the solution to be purified may be kept at a constant temperature, 25° C. for example, by conventional means which are not shown in the drawings.

The device according to FIG. 1 may be used, for example, for adsorbing urea from an aqueous solution containing 5 grammes per litre of urea as well as NaCl in solution in a sufficient amount for ensuring good ionic conductivity.

The proportion of carbon used for adsorption may then be about 40 grammes of carbon per litre of solution to be purified.

In that case, when the collector electrode 3A is maintained potentio-statically at a potential of —100 mv. with respect to the reference electrode ER, the initial current (72 ma.) decreases exponentially and reaches a value which is more or less zero after 8 hours.

An analysis of the remaining solution then shows a decrease of 1.2 grammes per litre in the concentration of urea in solution. Hence this corresponds to an adsorption of about 35 grammes of urea per kilogramme of carbon. However, in the absence of the action of the electrodes 3A and 3B, the capacity of carbon for adsorbing urea would be several times less.

It may be readily seen that the potential $V_A$ which must be applied in order to ensure optimum electroadsorption will depend, in each case, on the nature of the solution to be purified and of the constituent which is to be separated therefrom. The optimum conditions for electroadsorption, may, however, be readily determined in each case. As a mater of fact, a few adsorption tests with different values of the potential $V_A$ of the collector electrode with respect to the reference electrode ER, will allow the value of $V_A$ to be determined, which provides optimum electroadsorption for effecting the desired purification.

It may be readily seen that FIG. 1 shows the different parts of the described apparatus quite schematically. Thus, the collector electrode 3A and the stirrer 5 should obviously be adapted to provide optimum contact between the solution to be purified, all the particles in suspension and the electrode 3A.

Figure 2:
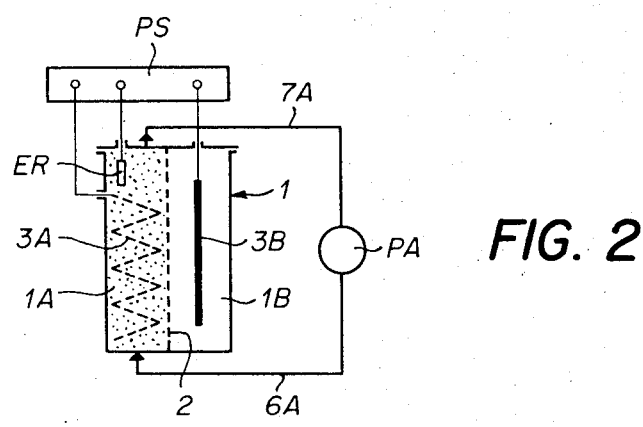
FIG. 2 is a schematic cross-section of a second embodiment.

The device according to the embodiment shown in FIG. 2 likewise comprises a container 1 which is adapted to receive the solution to be purified and is divided by a porous partition 2 into two compartments 1A and 1B equipped, respectively, with a collector electrode 3A associated with a reference electrode ER and with a counter-electrode 3B. These three electrodes are also connected to a potentiostat PS. Moreover, particles of adsorbent material, of active carbon, for example, are present in suspension in the compartment 1A so as to effect therein a purification of the solution by electroadsorption on these particles.

However, as may be seen in FIG. 2, the compartment 1A is provided with an admission pipe 6A and an outlet pipe 7A both connected to a pump PA so as to provide continuous circulation of the suspension of particles in the solution through this compartment 1A where electroadsorption occurs during contact of these particles with the collector electrode 3A. In the present case, the latter consists of a zigzag-shaped trellis arranged along the path of the suspension circulating through the compartment 1A. This circulation ensures good contact of all the particles of adsorbent material contained in the circuit 1A–7A–6A with the collector electrode 3A. One thus obtains an efficient utilization of all the particles of adsorbent material, thereby ensuring rapid electroadsorption of these particles.

Figure 3:
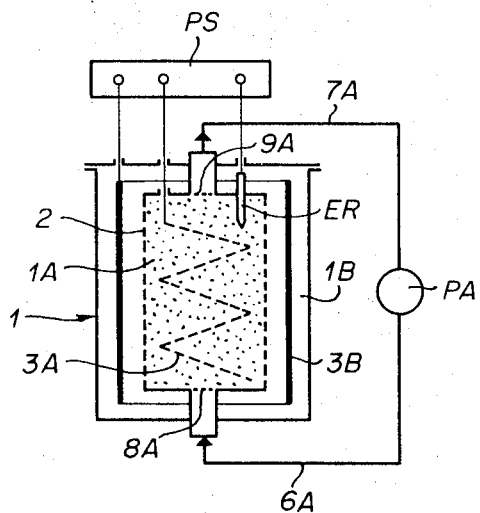
FIG. 3 is a schematic cross-section of a third embodiment.

The device according to the embodiment shown in FIG. 3 comprises a cylindrical container 1 adapted to receive the solution to be purified and enclosing a porous cylindrical partition 2 which is closed at both ends and forms the boundary of a compartment 1A surrounded by an annular compartment 1B. The axial compartment 1A is equipped with a collector electrode 3A, in form of a zigzag-shaped trellis, associated with a reference electrode ER. This compartment is also provided with an admission pipe 6A and an outlet pipe 7A, both connected to a pump PA, and communicates with these pipes via an inlet partition 8A and an outlet partition 9A. These partitions 8A and 9A are formed of porous plates adapted to permit passage of the solution to be purified while preventing passage of the particles of adsorbent material which is used in granular form in the present case. These particles, which may have a size of the order of 2 to 5 mm., are enclosed in the compartment 1A, in the form of a bed of particles which are fluidized or fixed and serve to effect electroadsorption by electrical contact with the collector electrode 3A.

Annular compartment 1B encloses a cylindrical counter-electrode 3B and the three electrodes 3A, ER and 3B are connected to a potentiostat PS, as already described.

The pipes 6A and 7A connected to the pump PA thus here solely provide circulation of the solution to be purified, through the compartment 1A, while the particles of adsorbent material remain enclosed in this compartment.

The compartment 1A shown in FIG. 3 may thus be arranged in the form of a cartridge which is readily removable so that it may be readily replaced when the absorbent material contained therein has been exhausted.

The three devices described above may each be combined with an artificial kidney such as is currently used for blood dialysis. As a matter of fact, these devices may be utilized for the continuous purification of the dialysis fluid, in order to eliminate urea therefrom, for example, whereby the amount of required dialysis fluid used in the artificial kidney may be notably reduced. The equipment used for blood analysis could thus be rendered much more compact.

Figure 4:
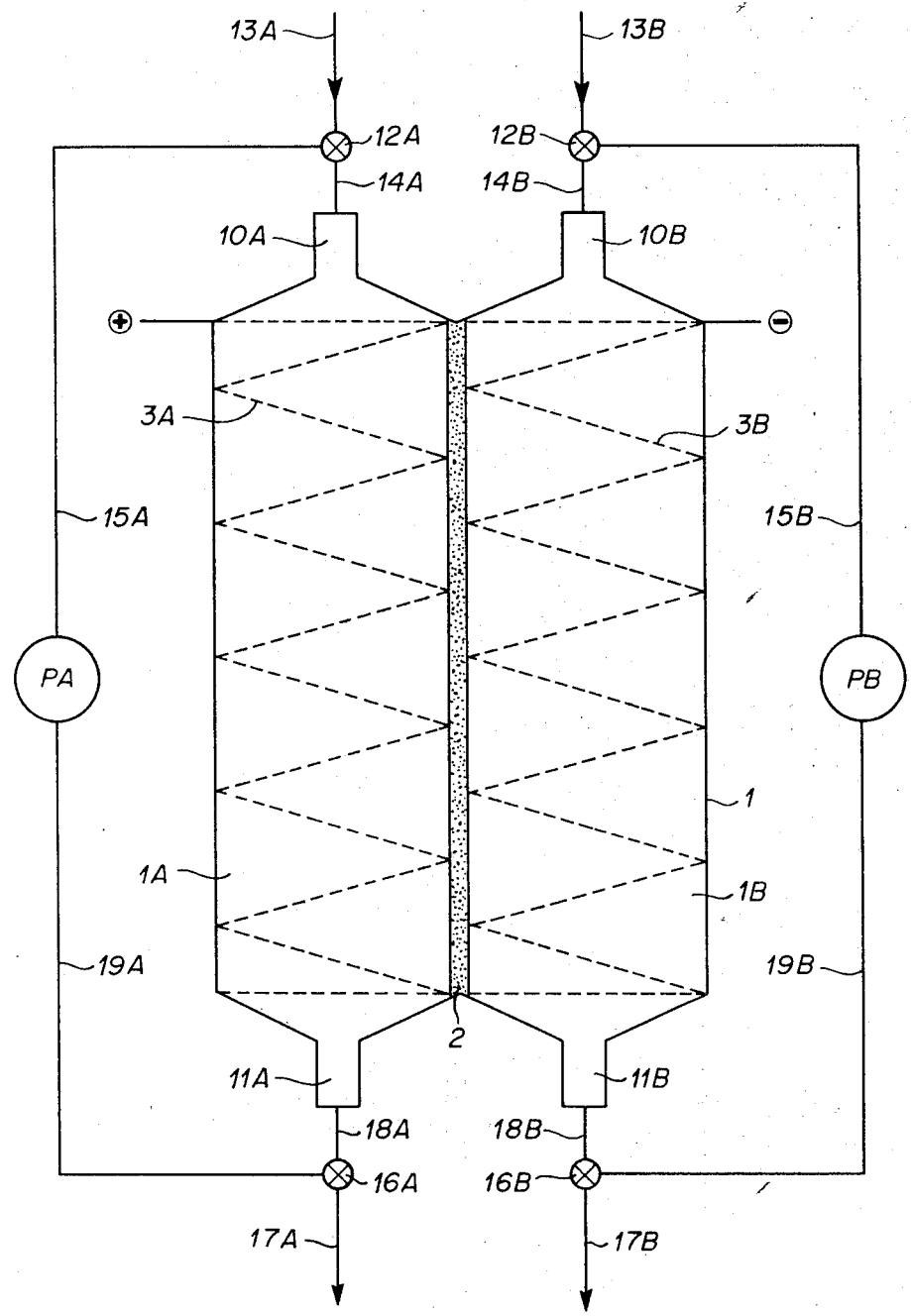
FIG. 4 is a schematic cross-section of a fourth embodiment.

The device according to the embodiment shown in FIG. 4 comprises a container 1 adapted to receive the solution to be purified and divided by a partition 2 of porous insulating material, into two compartments 1A and 1B respectively equipped with a positive collector electrode 3A and a negative collector electrode 3B.

The compartments 1A and 1B are each respectively provided with an upper inlet 10A, 10B and a lower outlet 11A, 11B. The electrodes 3A and 3B are respectively adapted for connection to the positive and negative poles of a direct current source which is not shown. The electrodes 3A and 3B extend respectively over the entire height of the compartments 1A and 1B and are each formed by a trellis of helicoidal or zigzag shape, so as to ensure current feed throughout the entire respective compartments.

Each of the compartments 1A and 1B are connected to a hydraulic circuit, the components of which will now be described with reference to one of them, in the present instance to the circuit including the compartment 1A, while it is understood that the hydraulic circuit comprising compartment 1B is identical in all respects. In the drawing, the corresponding elements of both hydraulic circuits are indicated by the same references and provided with an index A or B, depending on whether the components belong to the hydraulic circuit of compartment 1A or to that of compartment 1B.

Ahead of the inlet 10A of compartment 1A, the device comprises a three-way valve 12A comprising a first way connected to a conduit 13A for feeding the compartment 1A with solution to be purified, a second way connected to the inlet 10A by a tube 14A and a third way connected to the pump PA by a conduit 15A.

Beyond the outlet 11A of compartment 1A, the device comprises another three-way valve 16A, having a first way connected to a discharge conduit 17A, a second way connected to the outlet 11A by a tube 18A and a third way connected to the outlet of pump PA by a conduit 19A.

Figure 5:
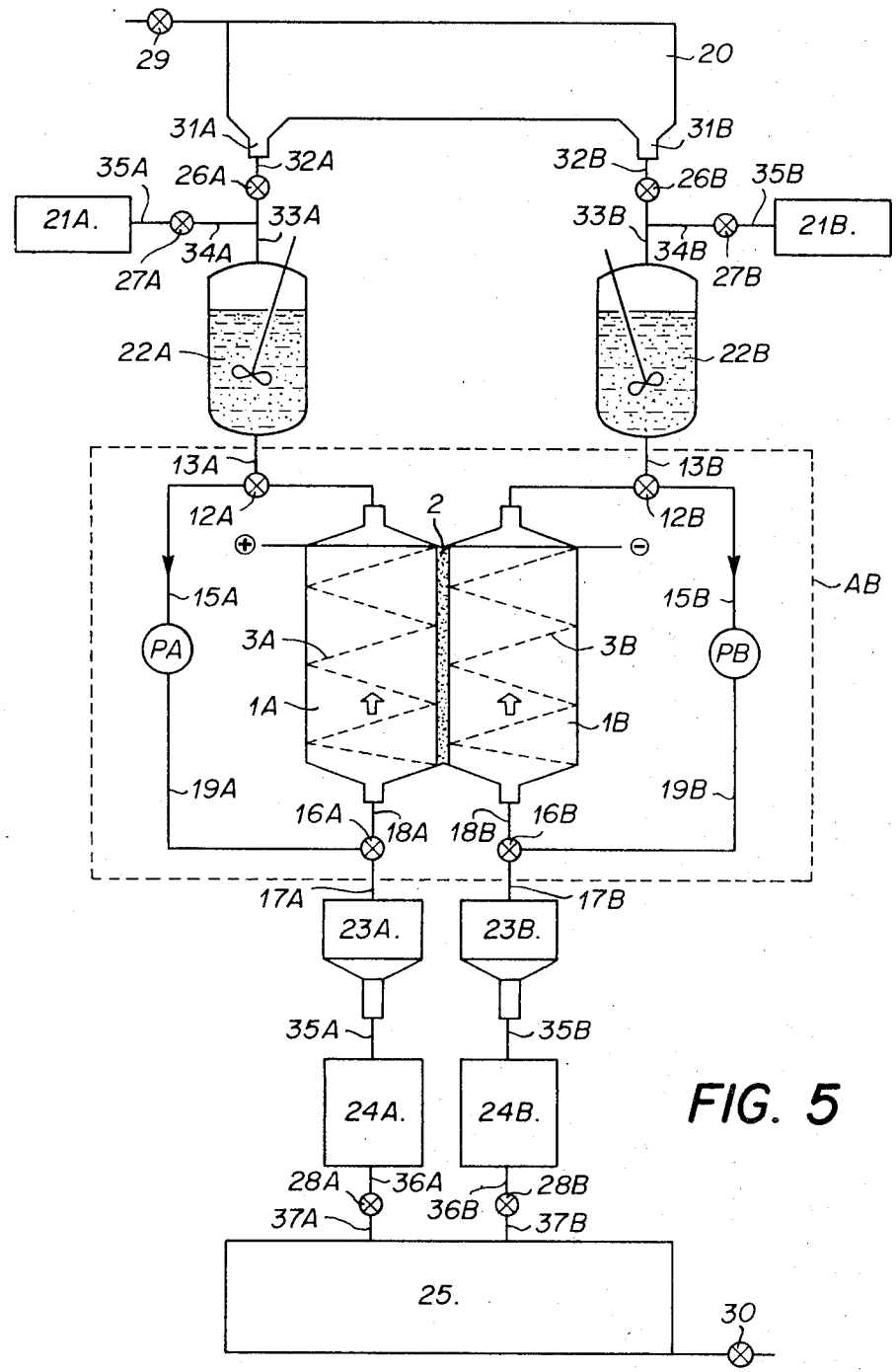
FIG. 5 is a schematic view of a purification installation comprising the device according to FIG. 4.

The described device may be included in an installation such as is shown in FIG. 5 of the drawing, wherein the device is enclosed entirely in rectangle AB shown in dashed lines.

This installation comprises, in addition to the described device, a reservoir 20 for receiving the liquid to be treated, two distributors 21A and 21B of adsorbent carbon in powder form, two mixing vessels 22A and 22B, two filters 23A and 23B, two intermediate reservoirs 24A and 24B, a final reservoir 25, as well as various valves 26A, 26B, 27A, 27B, 28A, 28B, 29 and 30.

As may be seen in FIG. 5, the valves 26A and 26B serve to control the rate of liquid flow from the reservoir 20 through outlets 31A and 31B and tubes 32A and 32B, towards the mixing vessels 22A and 22B respectively through tubes 33A and 33B. The latter each communicate with a lateral tube 34A and 34B, connected to the outlet of valve 27A and 27B, respectively.

The valves 27A and 27B are each connected by an intermediate tube 35A and 35B to the outlet of the carbon distributor 21A and 21B, respectively.

The mixing vessels 22A and 22B are respectively connected to the valves 12A and 12B by the conduits 13A and 13B. The filters 23A and 23B are respectively connected at their inlets to the valves 16A and 16B and at their outlets to the intermediate reservois 24A and 24B, by means of tubes 35A and 35B.

Each reservoir 24A or 24B is respectively connected at its outlet to the final reservoir 25 by means of the valve 28A and 28B and tubes 36A, 37A, and 36B, 37B, respectively.

Control of the various valves which the installation comprises, including control of the valves belonging to the device shown in detail in FIG. 4, may either be effected manually or automatically.

The above described device and installation may be used in different ways depending on the nature of the solution to be purified. The following examples relate to two modes of operating the installation according to FIG. 5.

EXAMPLE 1

Desalination of sea-water

The reservoir 20 is filled with sea-water and the distributors 21A and 21B respectively filled with a mass of carbon powder previously treated for facilitating the adsorption of $Cl^-$ ions and with a mass of carbon powder previously treated to facilitate the adsorption of $Na^+$ ions.

These treatments may be, for example, in the first case, an impregnation of the carbon with an amine and in the second case, an oxidation of the carbon with a sulphonitric mixture (⅓ sulphuric acid+⅔ nitric acid), so as to create oxygenated functional groups at the carbon surface.

It may here be mentioned that carbon may be replaced by any other adsorbent and electrically conducting material, for example iron or any other appropriate metal. The preferred choice of carbon is due to the fact that it presents the advantage of having a very large adsorbing surface per unit weight, which specific surface is greater by far than that of other known adsorbent materials.

One proceeds in the following manner in order to effect desalination of the sea-water contained in the reservoir 20:

the valves 26A, 27A and 26B, 27B are opened as to introduce into each of the mixing vessels 22A and 22B a given amount of sea-water and a given charge pretreated carbon powder.

The mixers of the vessels 26A and 26B are then operated until the carbon particles form a homogeneous suspension in sea-water and the respective suspensions are then introduced into the compartments 1A and 1B of the chamber 1, which is completely filled, by actuating the valves 12A and 12B.

The recycling circuits respectively comprising conduits 15A and 19A connected to pump PA and the conduits 15B and 19B connected to the pump PB, are likewise filled with the respective suspensions.

The compartments 1A and 1B of chamber 1 are then connected to their respective circuits 15A-PA-19A and 15B-PB-19B by actuating the valves 12A, 16A and 12B, 16B, respectively and then the pumps PA and PB are operated and the electrodes 3A and 3B are connected to the respective poles of the direct current source (not shown).

Due to the action of the pumps PA and PB, the suspension of carbon and sea-water is drawn off in the upper part of the compartments 1A and 1B and introduced at the lower part thereof. Consequently, continuous circulation is established in each compartment, from the bottom to top in the drawing, which circulation serves essentially to bring the different carbon particles into repeated contact with one part or the other of the respective electrodes 3A and 3B.

As soon as one of the carbon particles touches the corresponding electrode, the particle is brought to the potential of this electrode and fixes by adsorption the sodium ions or the chlorine ions, depending on whether the particle has been negatively polarized by contact with the electrode 3B in case of sodium or on the other hand the particle has been positively polarized by contact with the electrode 3A, in the case of chlorine. The number of ions which are fixed on the surface of each carbon particle depends on the extent of the surface and on the potential of the considered particle. It may here be noted that the partition 2 being permeable to ions, the sodium cations which are present in the compartment 1A may readily pass into the compartment 1B through the said partition so that they may be fixed on the carbon particles circulating in the compartment. In the same way, the chlorine anions present in the compartment 1B may pass through the partition 2 and penetrate into compartment 1A and may thus be fixed by the carbon circulating in that compartment.

The time for desalination of the sea-water which is in the suspension filling each of the compartments 1A and 1B depends on various factors and in particular on the more or less pronounced adsorbing qualities of the carbon used, on the specific surface of the carbon particles, on the amount of carbon used per litre of treated water, on the choice of the potential applied to the electrodes 3A and 3B, on the shape, the dimensions and the arrangement of the electrodes within the compartments 1A and 1B and likewise on the speed of circulation of the suspension within each of these compartments.

It may here be noted that the described device and installation may be used for desalination of sea-water at ambient temperature.

It may further be mentioned that, although the drawing and the descriptions only refer to a circulation of the suspension by means of a pump, this circulation may likewise be obtained in various other ways. Thus it may be contemplated to arrange a heater within each of the compartments 1A and 1B, or around the walls thereof, so as to create convection currents in the suspension in these compartments.

According to another variant, which may be considered in particular when the suspensions introduced into the compartments 1A and 1B are relatively low density, the chamber 1 may be subjected to repeated rocking movements so as to effect an agitation of the suspensions and consequently to bring the suspended particles into contact with the respective electrodes.

After a certain lapse of time which depends on the desired degree of desalination, the pumps are stopped, the electrodes 3A and 3B disconnected and the valves 16A and 16B are actuated so that the suspensions filling the compartments 1A and 1B may flow by gravity through the filters 23A and 23B, whereby to effect the separation of the solid phase of the suspension of each compartment (carbon bearing at its surface the sodium or chlorine ions), from the liquid phase formed by water which has been more or less desalinated, depending on the efficiency of the device.

This water may pass through the tubes 35A and 35B into the reservoirs 24A and 24B and may, if desired, be evacuated directly from these reservoirs. However, the valves 36A and 36B may also be opened and all the treated water collected in the reservoir 25, for subsequent use thereof.

It is moreover understood that the described installation according to FIG. 5 may likewise be used, in a similar manner to that described with reference to sea-water, for purifying brackish water, of rivers or lakes, for example. The prior treatment of the carbon may moreover be adapted from case to case to the nature of the constituents to be adsorbed.

It has been mentioned that, during desalination of sea-water as in Example 1, the filters 23A and 23B respectively retain carbon particles bearing chlorine anions and carbon bearing sodium cations, while the desalinated water is discharged to the reservoirs 24A and 24B. This carbon which is charged respectively with anions and cations may also be regenerated by electrodesorption with a view to its reuse. This may be done by introducing the charged carbon particles respectively into the distributors 21A and 21B of an auxiliary installation analogous to that described, the reservoir 20 whereof would be filled with sea-water, for example, while the electrodes 3A and 3B would be respectively connected to the electrodes of the main installation for desalinating sea-water. Of course, the electrode of this main installation should be connected to a source of electrical energy, whereby to deliver the energy necessary for producing electroadsorption of the chlorine and sodium ions in this installation and, in particular, an amount of energy corresponding to the losses of all types (thermal losses, current leakage, etc.) which normally occur during electroadsorption or electrodesorption.

The result of such simultaneous operation of the desalination installation and of the auxiliary installation allowing an electrical current to be delivered, would be as follows: production of desalinated water and carbon carrying sodium and chlorine ions, in the desalination installation, and production of water with higher salinity and of carbon which has been freed from sodium and chlorine ions, as well as electrical energy, in the auxiliary installation. The water with a high degree of salinity may of course be discharged into the sea, while the carbon liberated from the sodium and chlorine ions may be reutilized subsequently in the installation for desalination.

From the preceding remarks it may be readily seen that, in the combined installation mentioned above, the electrical energy necessary for operation of this installation is reduced since the amount of energy which is used for desalination of a given amount of water, during the considered desalination stage, may be largely recuperated during the salination stage.

EXAMPLE 2

Adsorption of gases dissolved in liquids

The described installation may likewise be used for the adsorption of gases dissolved in liquids for example of oxygen dissolved in water. In that case, the carbon powder which has been specially treated for adsorbing oxygen need be arranged solely in the distributor 21A so that a carbon suspension is formed only in the mixer 22A connected to the compartment 1A whereby oxygen molecules may be adsorbed by active carbon coming into contact with the positive electrode 3A only.

For separating the oxygen molecules in the water contained initially in the reservoir 20, the compartment 1A is filled with the suspension prepared in the mixer 22A and the compartment 1B is filled with water to which no carbon has been added. The electrodes 3A and 3B are next connected to the current source and the pump PA is operated, while the pump PB may remain inoperative since it is not indispensable to circulate the water within the compartment 1B.

Thanks to the circulation of the suspension within the compartment 1A, the different carbon particles which are in this suspension come successively into contact with electrode 3A, are positively charged and thus adsorb oxygen molecules. The amount of oxygen which is adsorbed will depend on the adsorbing capacity of the carbon used, on the specific surface and the amount of this carbon, on the configuration and arrangement of the electrode 3A, on the choice of the potential applied between the electrodes 3A and 3B, as well as on the duration of treatment. It may here be noted that it is not only the mass of water contained in the compartment 1A which is subjected to treatment but all the water contained in the chamber 1, since the oxygen molecules dissolved in the water contained in compartment 1B may pass into the compartment 1A through the partition 2.

Once the treatment of the water has been terminated, the valves 16A and 16B are opened, as before, so that the contents of the compartments 1A and 1B flows into the filters 23A and 23B, the carbon being retained by filter 23A. Out of these filters comes water which has been freed from a major part of the oxygen previously contained therein and which may be recuperated in the reservoirs 24A and 24B or in the reservoir 25.

Generally speaking, the described devices allow separation to be effected by electroadsorption, of various substances which are present in dissolved form in the solution to be purified. These devices thus have particularly interesting applications in numerous fields and in particular for the treatment of waste waters, for example with a view to separating phosphates contained in solution in these waters, and for the purification of galvanoplasty baths, for example for removing therefrom cyanid compounds or any other particularly noxious substances which may be contained therein.

The described devices and installation are not only suitable for the separation of inorganic compounds but may likewise be used for effecting electroadsorption of organic compounds present in solution. To this end, the porous partition 2 dividing chamber 1 into two compartments 1A and 1B should be adapted to permit the passage of the organic compound to be separated, from one compartment to the other, which compound may have a molecular dimension which is relatively large with respect to that of the ions.

Thus, for example, the described devices and installations may be used for eliminating dissolved urea from any physiological liquid, for example from blood serum. Such devices could thus constitute an artificial kidney and could, for example, form a unit which is readily transportable for treating a patient in successive stages.

The described devices and installation may likewise be used advantageously for purifying the blood of an individual who has adsorbed a strong dose of barbiturates or of any other poison which is readily assimilated by the blood, with a view to removing these noxious substances from the blood serum by electroadsorption.

It is moreover possible to contemplate the utilization of the described devices for electroadsorption of detergents contained in polluted waters. Thus, for example, the device shown in FIG. 3 may be used for circulating polluted water through a bed of carbon particles arranged in contact with a collector electrode and separated from the counter-electrode by a microporous membrane.

The described devices may likewise be used advantageously for the recuperation of relatively costly products, contained with a low concentration in an ionically conducting solution. Such a recuperation is difficult to achieve by conventional separation techniques and moreover often does not justify the costs involved. In contrast, a device according to FIG. 2 or FIG. 3, for example, allows a product such as penicillin to be fixed by electroadsorption on carbon in a relatively simple manner. The carbon containing the adsorped product may then be subjected to a desorption in a very limited amount of solvent, so as to obtain a concentrated solution of the product to be recuperated.

What is claimed is:
1. A method of adsorbing at least one impurity from an ionically conducting solution, comprising:
   (a) bringing a continuous stream of said solution into intimate contact with discrete particles of an electrically conducting adsorbent material; and
   (b) applying a given electric potential to each of said particles with respect to the said solution so as to achieve selective adsorption of at least said one impurity on each of said particles under the action of said potential.
2. A method as claimed in claim 1 wherein said particles consist of active carbon in granular or powder form.
3. A method as claimed in claim 1 comprising maintaining said particles in suspension in said stream of solution, flowing said suspension along at least one side of a porous partition separating a pair of electrodes, and establishing an electric field between said electrodes, such that each of said particles in suspension is repeatedly brought to said given potential by repeated contact thereof with one of said electrodes.
4. A method as claimed in claim 3 comprising continuously recycling said stream of solution bearing said particles in suspension through at least one of two compartments which are separated by said porous partition and each enclose one electrode of said pair.

References Cited
UNITED STATES PATENTS

| | | | |
|---|---|---|---|
| 3,553,092 | 1/1971 | Mund et al. | 204—180 P |
| 3,244,612 | 4/1966 | Murphy | 204—291 X |
| 3,515,664 | 6/1970 | Johnson et al. | 204—299 X |
| 3,616,356 | 10/1971 | Roy | 204—152 |
| 3,692,661 | 9/1972 | Shockcor | 204—152 X |
| 3,716,459 | 2/1973 | Salter et al. | 204—1 R |

JOHN H. MACK, Primary Examiner
A. C. PRESCOTT, Assistant Examiner

U.S. Cl. X.R.
210—39

Dedication 3,827,961.—*Denis Doniat*, Moillesulaz, *Augusto Porta*, Troinex, Geneva, and *Jacques Mosetti*, Grand-Lancy, Geneva, Switzerland. METHOD FOR PURIFYING IONICALLY CONDUCTING SOLUTIONS. Patent dated Aug. 6, 1974. Dedication filed Mar. 26, 1984, by the assignee, *Battelle Memorial Institute*.

Hereby dedicates to the People of the United States the entire remaining term of said patent.

[*Official Gazette May 29, 1984.*]